United States Patent [19]

Eschenburg

[11] Patent Number: 5,197,786
[45] Date of Patent: Mar. 30, 1993

[54] RIGID DRIVE AXLE WITH CAMBERED WHEEL HUBS

[75] Inventor: Rodney Eschenburg, San Diego, Calif.

[73] Assignee: National Racing Products, Inc., Milwaukee, Wis.

[21] Appl. No.: 771,596

[22] Filed: Oct. 4, 1991

[51] Int. Cl.$^5$ .............................................. B60B 37/00
[52] U.S. Cl. ............................ 301/124.1; 180/258; 180/906; 301/1; 280/661
[58] Field of Search .................. 301/1, 124 R, 124 H, 301/126, 127, 131, 132, 111; 280/661; 180/905, 906, 253, 254, 255, 258, 259

[56] References Cited

U.S. PATENT DOCUMENTS

| | | | |
|---|---|---|---|
| 1,841,418 | 1/1932 | Scott | 180/258 X |
| 1,937,821 | 12/1933 | Jarrett | 180/259 X |
| 2,768,698 | 10/1956 | Fabian | 180/255 |
| 3,401,981 | 9/1968 | Adams | 301/132 |
| 3,414,290 | 12/1968 | Wilfert et al. | 280/112 |
| 3,420,327 | 1/1969 | Nallinger et al. | 188/255 |
| 3,485,506 | 12/1969 | Melbar et al. | 280/87 |
| 3,520,377 | 7/1970 | Wallace | 301/132 X |
| 3,608,236 | 9/1971 | Beny et al. | 301/1 X |
| 4,752,079 | 6/1988 | Fahrner | 280/112 |
| 4,775,190 | 10/1988 | Jacobs | 301/124 R |
| 4,896,899 | 1/1990 | Lawrence | 280/775 |
| 4,927,169 | 5/1990 | Scaduto | 280/661 |

FOREIGN PATENT DOCUMENTS 0755620  8/1980  U.S.S.R. .................. 301/1

Primary Examiner—Russell D. Stormer
Attorney, Agent, or Firm—Wheeler Law Firm

[57] ABSTRACT

A rigid cambered drive axle has a straight rigid housing for the two drive axles and a cambered spindle, integral with the end of the housing, for supporting a wheel hub. A drive in each inside of the housing turns a cambered drive plate through a direction changing ball joint. The drive axle and the cambered spindle each have an axis that intersects the other at the direction changing drive ball joint. The axle housing is provided with internal bearing seats concentric with the drive ball joint. The axle housing is provided with internal bearing seats concentric with the drive axle and with the external bearing seats concentric with the wheel hub. The spindle supports the wheel hub at a degree of camber equal to the angle formed by the intersection of the central axes of the spindle and the drive axle, whereby the degree of camber of the wheel hub is kept constant.

5 Claims, 3 Drawing Sheets

RIGID DRIVE AXLE WITH CAMBERED WHEEL HUBS

BACKGROUND OF THE INVENTION

My invention relates to the field of automotive racing and specifically to the need to adjust the camber of a wheel of a stock car so that when the car is in a turn the rolling of the car's tires onto their sidewalls (tire roll) is reduced. However, while the invention is specifically intended for that use, it may have other uses in vehicles to provide camber where the axle structure would ordinarily permit camber.

Racing stock cars such as NASCAR'S, Grand National and Winston Cup Series cars, must use a rigid or non-independent rear drive axle system.

These stock cars operate primarily on banked oval race tracks, typically having high speed asphalt surfaces, in races that are three hundred to five hundred miles length. Races over these distances can last for several hours. On such a race track over 60% of each lap is spent with the car traveling on the banked turns of the oval race track. This means that the tires of the car are subject to a very high side load for a majority of the race. Because the cars use a rigid drive axle system considerable tire roll is experienced. Tire roll accelerates tire wear and creates unsafe handling conditions as well as actual tire failure. The rigid rear axle system required for stock car racing vehicles does not allow the wheel and the tire to remain at right angles to the banked track surface when the vehicle is in a turn; i.e. under side load conditions. Normally this problem can be corrected with a camber gain type independent rear suspension system like the ones used on the Indianapolis Speedway type racing cars. However, two reasons prevent the use of independent rear axle systems in stock cars. First, stock cars are stock American production passenger cars which do not use independent suspension systems like a camber gain type independent rear suspension system. Second and more importantly, the independent suspension units, while correcting the camber of the wheels, are not as "fail safe" as the rigid units. Thus in racing, even a car that usually has independent suspension is provided with a straight rigid axle for safety.

It is an objective of my invention to provide a very safe type of fixed cambered hub/spindle design which will provide the benefit of a cambered suspension and at the same time provide the safety benefits of a rigid suspension.

The present rear hub system incorporates a floating drive axle which is splined into a drive plate and a hub which is carried by roller bearings on a spindle which is part of the rigid axle housing. The axle housing, drive axles, bearings and hubs are on a common axis. The system is very fail safe. It prevents the axle, the brake, the wheel and the hub from falling off and causing a crash. In addition the current system is very strong and can survive the shocks and stresses associated with stock car racing much better than independent systems.

It is an objective of my present invention to improve upon the current rear hub system design used on stock cars by providing a slight camber to the hub/spindle design.

It is a further objective of the present invention to use the same types of hubs, bearings, seals, retaining nuts, and drive axles as are now being currently used by NASCAR and other racing associations. The skewed, (or cambered) spindle of the present invention thereby retains the same cross-sectional properties as the current 0° of camber axles. Consequently, the safety level of the present invention is at least equal to the same level of safety that exists in the current 0° camber axles.

I know of no other prior art which discloses the unique and novel design of my invention. For example, U.S. Pat. No. 4,752,079 (Fahrner) discloses a solid axle and a drive shaft connected to a wheel by a splined ball operating in a splined cavity in the wheel, with rolling balls connecting the two. A mechanism is shown to positively control the plane in which the wheel rotates by using a fluid pressure cylinder, so that not only camber but toe-in can be regulated. The only wheel bearing shown is the connection between the spherical shell of the splined cavity and a fixed block 13, having the same shape, mounted on the axle housing. (See FIG. 4 of the Fahrner patent). As is shown in figures four and five and as discussed at bottom column 4, beginning at line 47 and continuing into column 5, Fahrner contemplates either a solid axle or an independent suspension. The purpose of the invention is to increase or decrease contact between the tire and the road as required. On the other hand, the bearing arrangement is substantially different from my invention. My bearing arrangement is crucial feature of my invention and is totally different in structure. U.S. Pat. No. 3,414,290 (Wilfert) discloses wheels as being cambered but says substantially nothing about how the structure which is shown only schematically can be achieved. No structure disclosing how the wheels are cambered is illustrated. U.S. Pat. No. 4,927,169 (Scaduto) does not relate to a solid axle but to a wheel geometry in which the wheels themselves maintain zero camber while the body of the vehicle rolls. U.S. Pat. No. 3,485,506 (Nobar) shows wheels without solid axles that have a very complex independent suspension and exposed drive shafts having universal joints. U.S. Pat. No. 4,896,899 (Lawrence) shows a go-cart type vehicle having little in common with my invention except that splines are shown in the drive train.

DEFINITIONS OF TERMS

For the purpose of clarity the terms given below shall be interpreted throughout the specification and the claims as having the following definitions. Should there be any contradiction between the meaning given a term herein and its common meaning that term shall be interpreted as having both meanings. Camber is the inclination of wheels of a vehicle, where there is a vertical angle between the plane of the wheel and the vertical plane that includes the direction of vehicle travel. At 0° of camber there is no angle between the plane of the wheel and that vertical plane.

SUMMARY OF THE INVENTION

My invention is a spindle that is part of an axle houing which house a drive axle. My invention requires hub bearing seats machined on an angled or cambered axis, intersecting the drive axle axis, so that the hub, wheel, and tire rotate on the angled or cambered axis, while the drive axle rotates around the drive axle axis which is parallel to the vertical plane that includes the direction of vehicle travel.

Changes required from the currently used rigid drive axle system are in the spindle and the drive plate. The axle housing, the hub, and the drive plate are generally concentric to the drive axle and must remain so, while the spindle must be machined to operate in the angled axis portion. Because of the angle at which the drive axle intersects the drive plate, a direction changing joint must be employed to provide the desired angular motion for turning the wheel. Further, in order to maintian exact tread width, in a manner similar to the way tread width is maintained in a 0° cambered hub, the axle housing must be trimmed to a calculated dimension that compensates for the degree of camber of the present invention.

In the present invention a spherical unit, which has the standard axle splines or key ways located internally and a series of external lugs or keys which engage internal splines or key ways in the drive plate, is used as the direction changing joint. Preferably the spherical unit also contains an axle travel limiting screw.

When a vehicle is designed for road travel, any camber is oppositely directed in the right and left wheel. The left wheel is angled to increase the footprint, or rubber area of contact with the road, during left turns when it is most effective because of weight transfer to the left. The right wheel is oppositely angled to put the greater footprint on the road during right turns and right weight transfer. In front wheels that arrangement also enhances steering control.

However, a car that races on a track that always turns in one direction needs to be arranged for turns only in that direction. In that case my invention may be applied to camber both left and right wheels to the same side of the verticle plane so that both apply increased footprint to the track during the turns encountered during a race. The spindle axes thus becomes parallel rather than oppositely inclined. Accordingly, in automobile racing, where the car travels on a banked oval or circular track, the wheel/axle arrangement may generally be described as /------/. The back slashes and dashes in the visual representations herein represent examples of the direction the wheels may be cambered with respect to the vertical plane and the axle. However other wheel/axle arrangements e.g. -----/ or /----- , may be used with the device of my invention without departing from its basic principles. Also, it is important to note that when the wheel/axle arrangement is thus, /-----/, the spindles for each end of the axle housing do not share a common longitudinal axis but rather have parallel axes as the result of the angles at which the spindles must be machined to impart the desired camber to the wheels. However, when the wheel/axle arrangement is thus, /---- or variations therebetween, the axes of the spindles intersect one another. Accordingly, the camber of each individual wheel may be made different from any other wheel depending upon the use to which the automobile is put or the desire of the user.

My invention may be described as a device specifically for use in a car designed to run on the curve of a tilted track the majority of the time. In such a car it is highly desirable to tilt the wheels so that they conform better to the titled track in order to preserve the tires and to put more rubber on the track. Radial tires make this more important but it would be important regardless of the type of tire used. It would be possible to design an axle that would pivot in such a way that the tire could align itself better with the flat roadway but for safety reasons and strength reasons small stock cars in fact use rigid axles of the kind found on pick-up trucks. This makes it impossible to tilt the wheel in such a way as to reduce wear. My solution to this problem does not reduce the strength of the axle. My solution is to machine the end of the axle housing, which does not rotate, so that the seat for the bearings is concentric with an axis which is in the same vertical plane as the axis of the rotating axle but which is also at an intersecting angle to the drive axle axis. The wheel hub and wheel are thus tilted, or cambered, to allow the tire to more directly face the road surface.

This also means that the drive axle is not precisely aligned with the hub. This is taken into account by having the drive axle splined to a surrounding ball shaped member. The hub of the wheel is provided with a ball shaped cavity which rides on the surface of a ball shaped member. The ball shaped member has cylindrical projections which extend into slots in the hub. The slots in the hub are the same width as the cylindrical projections but are long enough in the axial direction to allow the cylindrical projection on the ball to move back and forth in the slot as the parts turn on their separate axes. This allows the ball to rotate in the plane of the drive axle while the hub rotates in the slightly cambered plane of the hub bearings. As the ball makes one rotation each cylindrical projection moves from one end of the slot to the other and back again, in reciprocating motion, but the side of the projection is always in driving contact with the hub at the side of the slot.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 2:
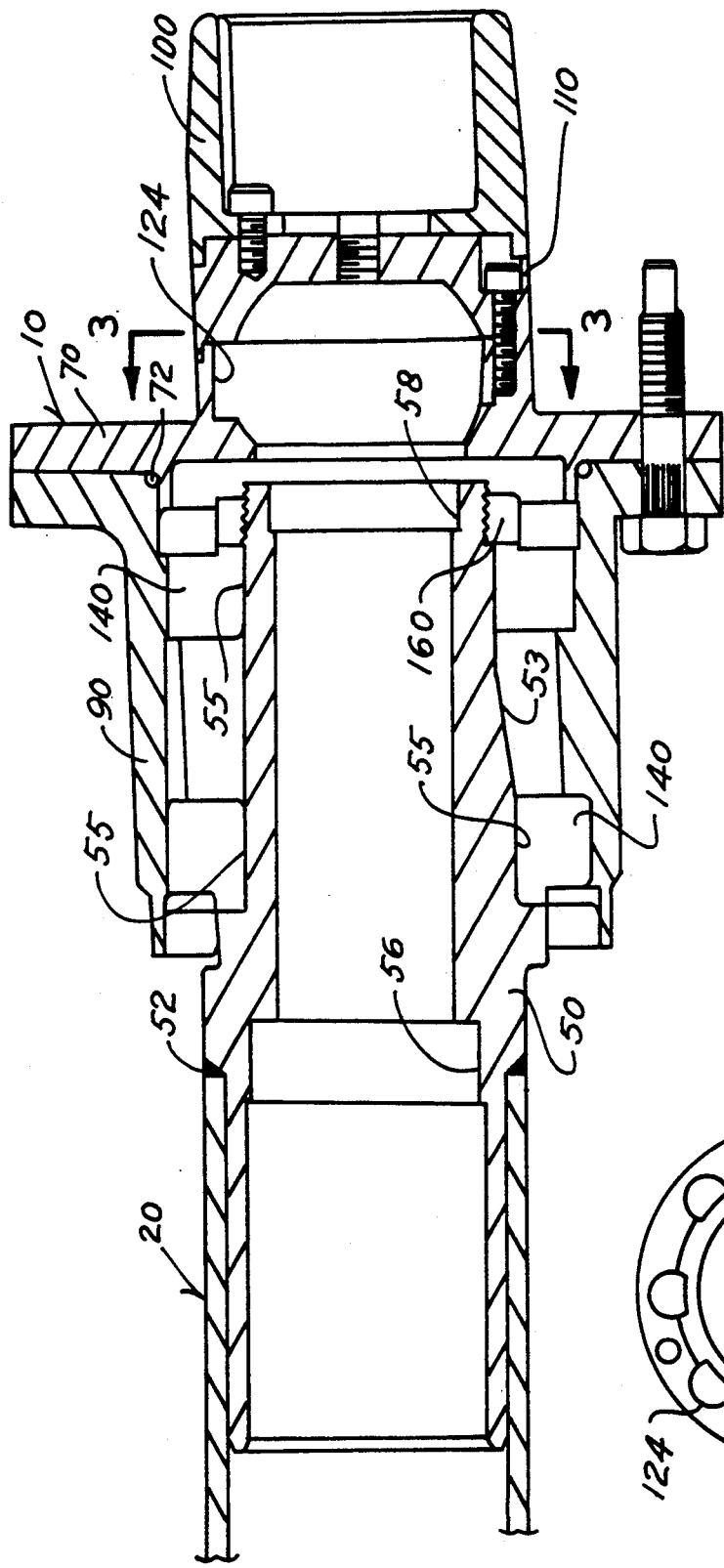
FIG. 2 discloses a cut away side view of the cambered drive axle assembly of the present invention without the drive axle or drive ball shown.
Figure 3:
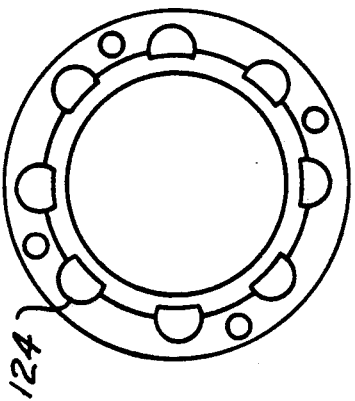
FIG. 3 is a view from line 3—3 of FIG. 2 without the drive ball.
Figure 4:
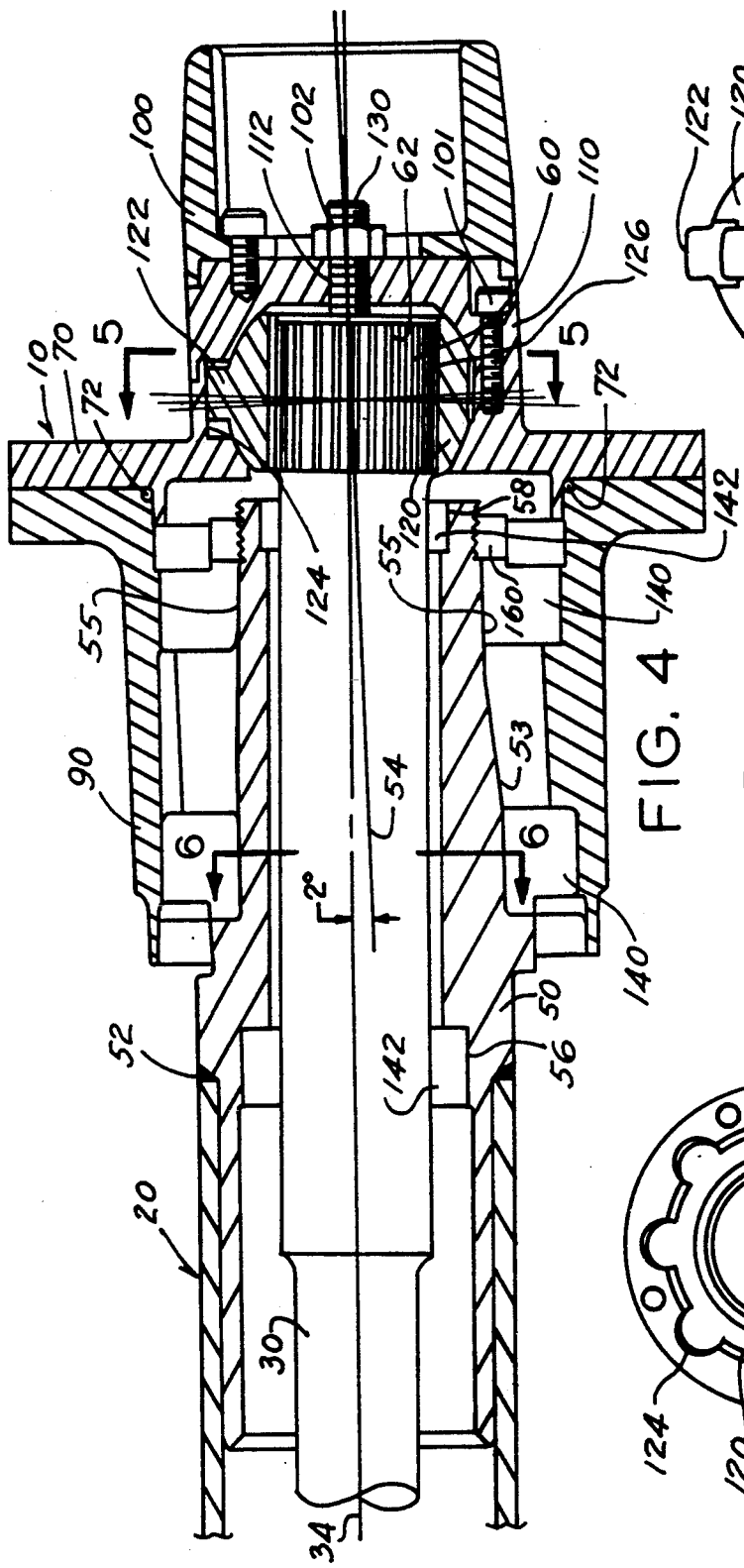
FIG. 4 is a cut away side view of the cambered drive axle assembly of the present invention showing the relationship of the axes of the spindle, the drive axle, and the wheel hub.
Figure 7:
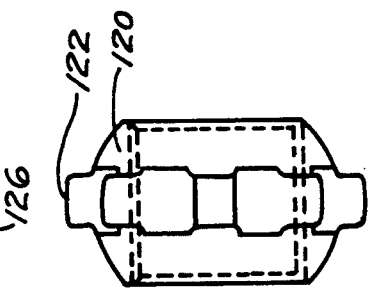
FIG. 7 is a side plan view of the drive ball.
Figure 6:
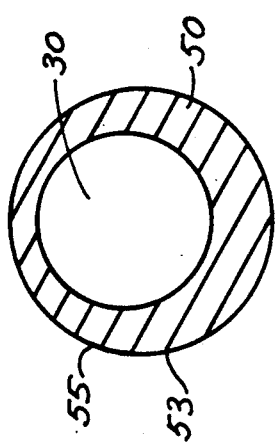
FIG. 6 is a view from line 6—6 of FIG. 4 showing the relationship of the drive axle to the spindle.
Figure 5:
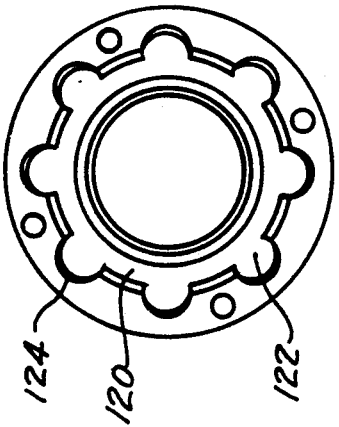
FIG. 5 is a view from line 5—5 of FIG. 4 showing the drive ball.

Referring to the figures, especially FIGS. 2, 4, and 6, the cambered drive axle assembly 10 may be seen. The assembly comprises a drive axle housing 20, a drive axle 30, a cambered spindle 50, a drive plate 70, a hub 90, a hub cap 100, a hub cap retainer 110, a drive ball 120, a plurality of bearings 140, and a retaining nut 160.

As may be seen from FIGS. 2, 4, and 6 the axle housing 20 and the cambered spindle 50 are connected at welds 52 to form a strong rigid housing about the drive axle 30. The drive axle 30 extends through the axle housing 20, the cambered spindle 50, and ends in a splined end 60, having external splines 62, which engage a drive ball 120. The drive ball 120 has internal splines 126 which engage the external splines 62 of the splined end 60 of the drive shaft 30. This allows the drive shaft 30 to turn the drive ball 120.

The surface of the drive ball 120 has external lugs or keys 122 which fit into internal key ways 124 located on the drive plate 70. Consequently, the drive ball 120 acts as a direction changing means for transferring the turning the force of the drive axle 30 to the drive plate 70.

Still referring to FIG. 4 it may be seen that the drive axle 30 and the cambered spindle 50 each have central axes, 34 and 54 respectively, that intersect at the drive ball 120 to form an angle of intersection of approximately 2 degrees. The angle of intersection is the result of the camber given the spindle 50.

Figure 1:
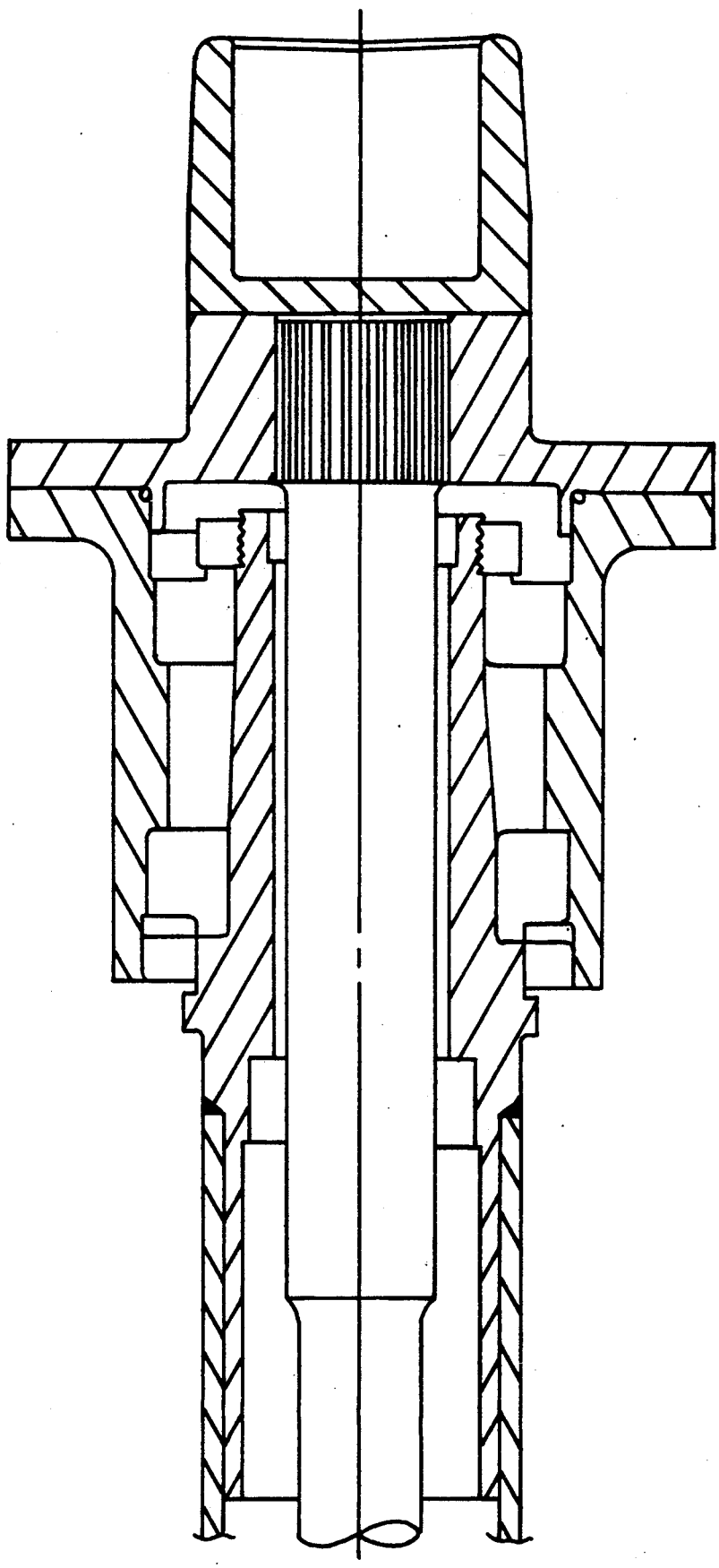
FIG. 1 is a drawing of a prior art rigid drive axle having 0 degrees of camber.

The drive axle 30 rests on roller bearings 142 which are journaled into the inside surface areas 56 and 58 of the spindle 50. The roller bearings 142 are journaled into the surface areas 56 and 58 at an angle which compensates for the camber of the spindle 50 so that the linear axes of the roller bearings 142 are parallel to the linear axis 34 of the drive axle 30 whereby the drive axle 30 may freely rotate within the spindle 50 despite the camber of the spindle 50. This allows the drive axle 30 to be supported by the spindle 50 in a manner similar to that shown in FIG. 1 even though both the spindle 50 and the drive axle 30 have central axes that are not common or parallel to each other. Accordingly, the camber of the spindle 50 is not disturbed.

Alternatively, any other type of bearing may be used so long as its bearing surface is kept concentric to the drive axle 30 so that free rotation of the drive axle 30 in connection with the bearing surfaces is possible.

The spindle 50 has journals 55 for holding roller bearings 140 on its outside surface 53. The journals 55 are machined so that the roller bearings 140 extend along the cambered axis 54 of the spindle 50. The roller bearings 140 support the wheel hub 90 and allow the wheel hub 90 to freely rotate on the spindle 50. This orientation of the roller bearings 140 gives the wheel hub 90 the same degree of camber as the spindle 50. The retaining nut 160 also helps maintain the position of the roller bearings 140 on the spindle 50.

The wheel hub 90 is connected to the drive plate 70 by welds 72; although any other suitably strong connecting means may be used. Thus the drive plate 70 has the same camber as the wheel hub 90.

As previously discussed, the internal key ways 124 of the drive plate 70 are engaged with the external keys 122 of the drive ball 120. However, because the drive plate 70 has the same degree of camber as the wheel hub 90, the internal key ways 124 of the drive plate 70 are also at this same angle of camber while the external keys 122 of the drive ball 120 are at right angles to the axis 34 of the drive axle 30. This produces a path of travel for the external keys 122 that, as the drive ball 120 spins, is at an angle to the internal key ways 124. Accordingly, the path of travel of the external keys 122 oscillates from one end of the internal key ways 124 to the other as the drive ball 120 is spun by the drive axle 30. In order to prevent the external keys 122 from jamming against the ends of the internal key ways 124 the length of the internal key ways 124 must always be sufficiently greater than the length of the external keys 122 to compensate for the path of travel of the external keys 122. Thus the oscillation external keys 122 is compensated for and the turning force of the drive axle 30 is effectively transferred to the drive plate 70 and the wheel hub 90 while the camber of the drive plate 70 and the wheel hub 90 is kept constant.

Alternatively, a universal joint or any other type of mechanism known or obvious to one skilled in the art, who has read this specification, may be used. The important point is that the camber of the wheel hub 90 remains constant even though the axis 34 of the drive axle 30 is at an angle to the axis 54 of the spindle 50.

In order to properly hold the hub 90, drive plate 70, and drive ball 120 in proper position the drive ball 120 is preferably covered by a hub retainer cap 110 which is held in place by a bolt 101. The centers of the hub cap 100 and the hub retainer cap 110 having openings, 102 and 112 respectively, for receiving a drive axle positioning screw 130. The drive axle positioning screw 130 allows the drive axle 30 to be properly positioned for engagement with the drive ball 120 and also prevents the drive axle 30 from bottoming out on the hub retainer cap 110 as the drive ball 120 rocks or oscillates. In this manner the parts of the axle assembly 10 are kept in strong, rigid, and proper orientation with one another.

What is claimed is:

1. An improved cambered axle assembly including a wheel hub, a drive plate connected to the wheel hub, a direction changing joint, and a plurality of bearings having bearing surfaces, the improvement comprising:

a hollow cambered spindle means, having a first longitudinal axis and a inside surface and an outside surface, for providing a predetermined degree of camber to the wheel hub;

a drive axle means, connected to the direction changing joint and extending through the hollow cambered spindle means along a second longitudinal axis at a fixed angle to said first longitudinal axis, for driving the drive plate through the direction changing joint;

the first longitudinal axis intersecting the second longitudinal axis;

a portion of the inside surface of the hollow cambered spindle means including a first journal means for receiving a first portion of the plurality of bearings;

the first journal means being generally concentric to the second longitudinal axis of the drive axle means and the first portion of bearings being seated in the first journal means and in rolling contact with the drive axle;

a portion of the outside surface of the hollow cambered spindle means including a second journal means for receiving a second portion of the plurality of bearings;

the second journal means being generally concentric to the first longitudinal axis of the hollow cambered spindle means and the second portion of bearings being seated in the first journal means and in rolling contact with the wheel hub;

whereby the wheel hub is cambered with respect to the drive axle means.

2. A cambered axle assembly including a wheel hub, supported by bearings and having a predetermined degree of camber, connected to a drive plate and a direction changing joint, the cambered axle assembly comprising:

a generally tubular spindle means, extending along a first axis, for supporting the bearings and the wheel hub;

a drive axle means, extending along a second axis within the generally tubular spindle means, for driving the drive plate through the direction changing joint;

a bearing means, having a bearing surface, for bearing against the drive axle means;

the second axis intersecting the first axis to form an angle;

the generally tubular spindle means having an interior surface area means for receiving the bearing means at an angle sufficient for the bearing surface to be generally parallel to the second axis;

the generally tubular spindle means supporting the wheel hub at a degree of camber equal to the angle formed by the intersection of the first axis and the second axis.

3. The cambered axle assembly of claim 2 in which the direction changing joint comprises a drive ball, capable of being turned by the drive axle, having key means for insertion into a key way;

the drive plate having key way means for receiving the key means;

the key means capable of oscillating within the key way means when the drive ball is turned by the drive axle;

the key way means being of sufficient size to accommodate the oscillation of the key means.

4. A drive axle having a rigid housing having a drive shaft axis, and a cambered hub axis at an angle to the drive shaft axis, wheel bearings at the end of the rigid housing, seats for the wheel bearings on the rigid housing which are coaxial with said cambered hub axis, a drive axle end provided with a splined connection to a drive ball, a wheel hub revolving in a plane normal to said cambered hub axis and journaled onto the drive ball and the wheel bearings, a pluality of projections forming an annular series around the drive ball, slots in the wheel hub forming an annular series inside the wheel hub receiving said projections from the drive ball, the slots being only as wide as the projections and having an axial extension beyond the projections whereby to accommodate the misalignment between the cambered hub axis and the drive axle axis whereby said hub is cambered with respect to the drive axle axis.

5. A rigid drive axle comprising:

a cambered wheel hub including;

a drive plate having a receptacle including a key way;

a drive means engaged with the receptacle, for driving the drive plate;

the driving means having a key in oscillating engagement with the key way;

the drive plate being mounted to the cambered wheel hub;

the drive means driving the drive plate through the oscillating engagement of the key to the key way;

the key capable of oscillating with respect to the key way when the drive plate is driven by the drive means.

* * * * *

REEXAMINATION CERTIFICATE (2608th)
United States Patent [19]
Eschenburg

[11] B1 5,197,786

[45] Certificate Issued Jun. 20, 1995

[54] RIGID DRIVER AXLE WITH CAMBERED WHEEL HUBS

[75] Inventor: Rodney Eschenburg, San Diego, Calif.

[73] Assignee: National Racing Products, Inc., Milwaukee, Wis.

Reexamination Request:
No. 90/003,570, Sep. 15, 1994

Reexamination Certificate for:
Patent No.: 5,197,786
Issued: Mar. 30, 1993
Appl. No.: 771,596
Filed: Oct. 4, 1991

[51] Int. Cl.$^6$ ............................................. B60B 37/00
[52] U.S. Cl. ..................... 301/124.1; 301/1; 180/258; 180/906; 280/661
[58] Field of Search ............... 301/1, 124.1, 126, 127, 301/125, 128, 131, 132, 111; 280/661; 180/905, 906, 253, 254, 255, 258, 259

[56] References Cited

U.S. PATENT DOCUMENTS

4,752,079 6/1988 Fahrner ........................ 280/112
4,775,190 10/1988 Jacob ........................... 301/124.1

OTHER PUBLICATIONS

"Circle Track" magazine, Jul. 1990 edition, pp. 107–113.
*The Unfair Advantage*; Mark Donohue; 1975; pp. 158, 159.
*Changing Gears, The Development of the Automotive Transmission*; Phillip G. Gott; 1991; p. 60.

*Primary Examiner*—Russell D. Stormer

[57] ABSTRACT

A rigid cambered drive axle has a straight rigid housing for the two drive axles and a cambered spindle, integral with the end of the housing, for supporting a wheel hub. A drive in each inside of the housing turns a cambered drive plate through a direction changing ball joint. The drive axle and the cambered spindle each having an axis that intersects the other at the direction changing drive ball joint. The axle housing is provided with internal bearing seats concentric with the drive ball joint. The axle housing is provided with internal bearing seats concentric with the drive axle and with the external bearing seats concentric with the wheel hub. The spindle supports the wheel hub at a degree of camber equal to the angle formed by the intersection of the central axes of the spindle and the drive axle, whereby the degree of camber of the wheel hub is kept constant.

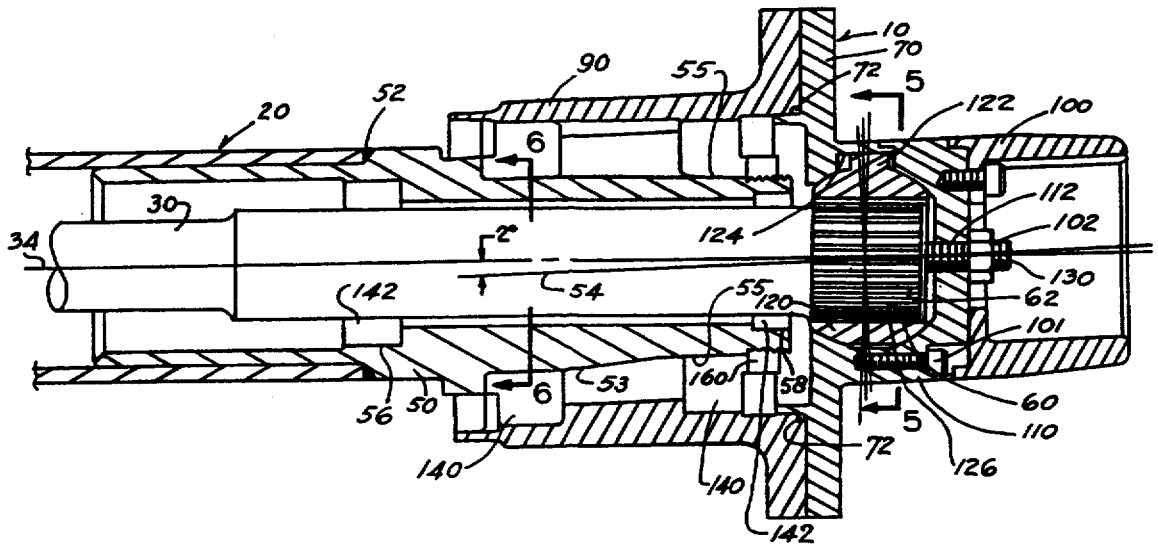

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-5 is confirmed.

* * * * *